(12) United States Patent  (10) Patent No.: US 6,637,654 B2
Kuo  (45) Date of Patent: Oct. 28, 2003

(54) SCAN DEVICE WITH ELASTIC RESERVE TYPE AND ITS SCAN METHOD

(75) Inventor: Shih-Wen Kuo, TaiNan (TW)

(73) Assignee: Umax Data Systems (TW)

( * ) Notice: Subject to any disclaimer, the term of this patent is extended or adjusted under 35 U.S.C. 154(b) by 0 days.

(21) Appl. No.: 10/010,056

(22) Filed: Dec. 7, 2001

(65) Prior Publication Data

US 2003/0106939 A1 Jun. 12, 2003

(51) Int. Cl.[7] .................................................. G06K 7/10
(52) U.S. Cl. ................................... 235/459; 235/462.01
(58) Field of Search ........................... 235/459, 462.01, 235/462.45, 470, 472.01

(56) References Cited

U.S. PATENT DOCUMENTS

| 5,861,615 | A | * | 1/1999 | Bridgelall et al. | ..... 235/462.45 |
| 5,862,446 | A | * | 1/1999 | Hashizume et al. | ........ 399/367 |
| 5,988,508 | A | * | 11/1999 | Bridgelall et al. | ....... 235/462.4 |
| 6,002,508 | A | * | 12/1999 | Mai | ........................... 359/212 |
| 6,173,623 | B1 | * | 1/2001 | Castor et al. | ............... 74/337.5 |
| 6,233,065 | B1 | * | 5/2001 | Lee | ............................. 358/475 |
| 6,344,906 | B1 | * | 2/2002 | Gatto et al. | .................. 358/443 |
| 6,489,602 | B1 | * | 12/2002 | Wang et al. | ............. 250/208.1 |

FOREIGN PATENT DOCUMENTS

JP          409218552    * 8/1997   .......... G03G/15/00

* cited by examiner

Primary Examiner—Daniel St. Cyr

(57) ABSTRACT

The invention is a scan device with elastic reserve type and its scan method, mainly applied to the light, thin, short and small scanner, image recorder, etc. The invention includes a guide bar, a chassis, a gear structure, an elastic module, a fastening structure and a sensor device, wherein, a scan module is on the chassis, the gear structure is consisting of at least one gear, the fastening structure is consisting of at least two fasteners and the sensor device is consisting of at least two sensors with one objective. To use the elasticity with the feature of reserving ability and the fastening structure is to move the chassis for scanning. The scanning motion of start and stop is via the sensor device. For combining the function of the above each part, most of them take traditionally mechanical transmission except that scan module is electrical power.

7 Claims, 4 Drawing Sheets

# SCAN DEVICE WITH ELASTIC RESERVE TYPE AND ITS SCAN METHOD

1. FIELD OF THE INVENTION

The invention is related to a technology of a scan device with elastic reserve type and its scan method, especially applied to small scanners, palm scanners, bus power scanners, small image recorders, etc.

2. BACKGROUND OF THE INVENTION

Small motors mainly drive the small scanners of current market, but the situation is sort of increasing cost from economic point. Basically, the small scanner scans smaller area, the present communication interface as USB and 1394 (another called Firewire) which buffer and communication have no problem on that scanner moving back and forth or inconstant speed. Further, both USB and 1394 support with BUS POWER, thus to be instead of motor is a tendency, because motor power consumption is more than others.

All accessories within business trip are enquired to be light, thin, short and small; thus, motor weight always occupies the most percentage of total weight for small scanner. Having a new design to replace prior motor for improving competition is a need.

Further, limited space of small scanner limits motor dimensions. Usually, motor power is direct proportion to its volume. So, to determine that space and power is the first priority problem for designer. View from the above point, an improvement for the power of the small scanner is an essential.

The disclosed prior art in the patent number 370325 of the Republic of China is that the motor with low power and small volume cooperating with the driven module with the type of potential energy transferring to kinetic energy for reaching the object of the application of electric power and potential energy simultaneously transferring to kinetic energy. Thus, the cost for electric power is saved. On the other hand, motor is still there, and problem is still there.

SUMMARY OF THE INVENTION

The first object is to save power. Using elasticity with the feature of reserving ability to drive chassis for scan is an extremely economic design, and it avoids energy consumption.

The second object is to decrease the weights of small scanner, palm scanner, bus power scanner, small image recorder, etc. for business travelers' convenience. The spring of scanner is lighter than the prior art; therefore the invention is totally different than the prior art within long trip.

The third object is to save power cost, motor cost, design cost, etc. Directly, scanner price is down and competition is promoted.

For further understanding to committee, the following is brief description of the drawings.

DETAILED DESCRIPTION OF THE INVENTION

Figure 1:
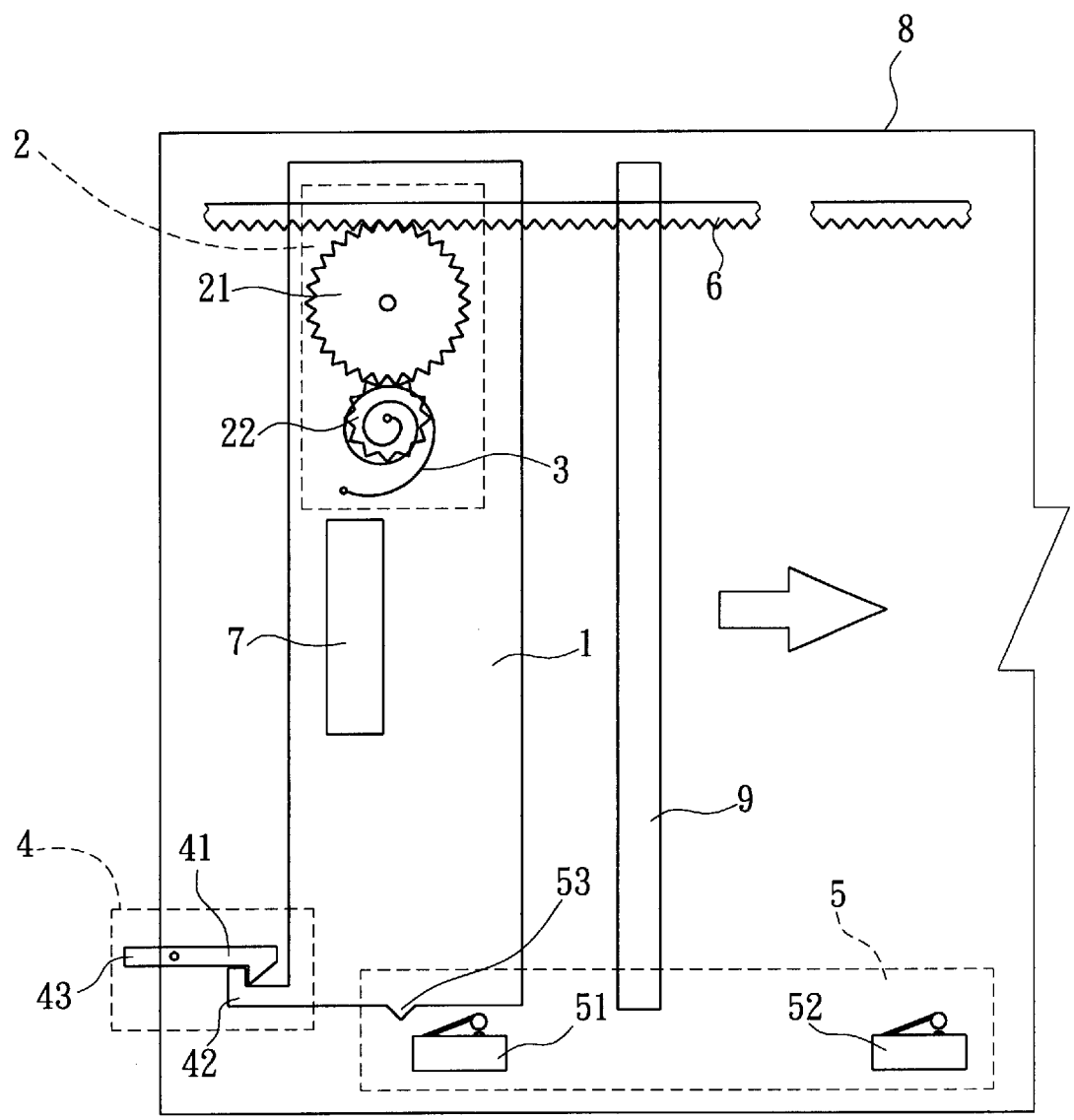
FIG. 1 is the preferred embodiment of the invention.

Please refer to FIG. 1, which is the preferred embodiment of the invention. A guide bar 6, which is installed on scan body 8 to guide a chassis 1 moving back and forth. The chassis 1, which is perpendicular to guide bar 6, and a light source, a mirror module, a lens module (the above three are prior art, not shown in the figure.) and a scan module 7 are set on guide bar 6. Normally, the scan module 7 is CCD (Charge Couple Device) or CIS (Contact Image Scan) (if scan module 7 is CIS, the chases 1 is without mirror module and lens module.). A gear structure 2, which includes a big gear 21 and a small gear 22, and the gear structure 2 is mounted on chassis 1 to work with guide bar 6 for transmission. Another words, the gear structure 2 is active to drive the guide bar 6. An elastic module, a spring structure 3, is designed on chassis 1 to work with gear structure 2 as well. An imagination force moving chassis 1 toward left on FIG. 1 makes that gear structure 2 is turned by working with guide bar 6 to directly reserve a suitable amount of elastic potential energy in spring structure 3. To temporarily reserve the elastic potential energy is via that a fastening structure 4, which includes an elastic fastener 41 and a fixed fastener 42. The elastic faster 41 is on scan body 8 and the fixed fastener 42 is on chassis 1, further, elastic fastener 41 is a special design for the following situation: elastic fastener 41 is designed to be moved counterclockwise by fixed fastener 42 moving toward left on FIG. 1, and elastic fastener 41 going back to original position for buckling fixed fastener 42. Therefore, the buckling is to let spring structure 3 not be released to temporarily reserve elastic potential energy. After releasing the buckling, which means that moving elastic fastener 41 counterclockwise again and fixed fastener 42 taking off from elastic fastener 41, spring structure 3 is driven by elastic force itself to gear structure 2 for moving the whole chassis 1 along guide bar 6. Thus, chassis 1 moves toward right on FIG. 1 for scanning movement. As showing in FIG. 1, a sensor device 5 includes a first sensor 51, a second sensor 52 and a protrusion 53, and the protrusion 53 is set on chassis 1. When spring structure 3 reserves a certain amount of elastic potential energy and fastening structure 4 releases the energy, chassis 1 moves a distance toward right on FIG. 1, protrusion 53 meets the first sensor 51 on scan body 8, therefore, first sensor 51 starts scanner to scan. After chasing moving further distance, protrusion 53 meets the second sensor 52 on scan body 8, second sensor 52 shuts down scan action.

Figure 2:
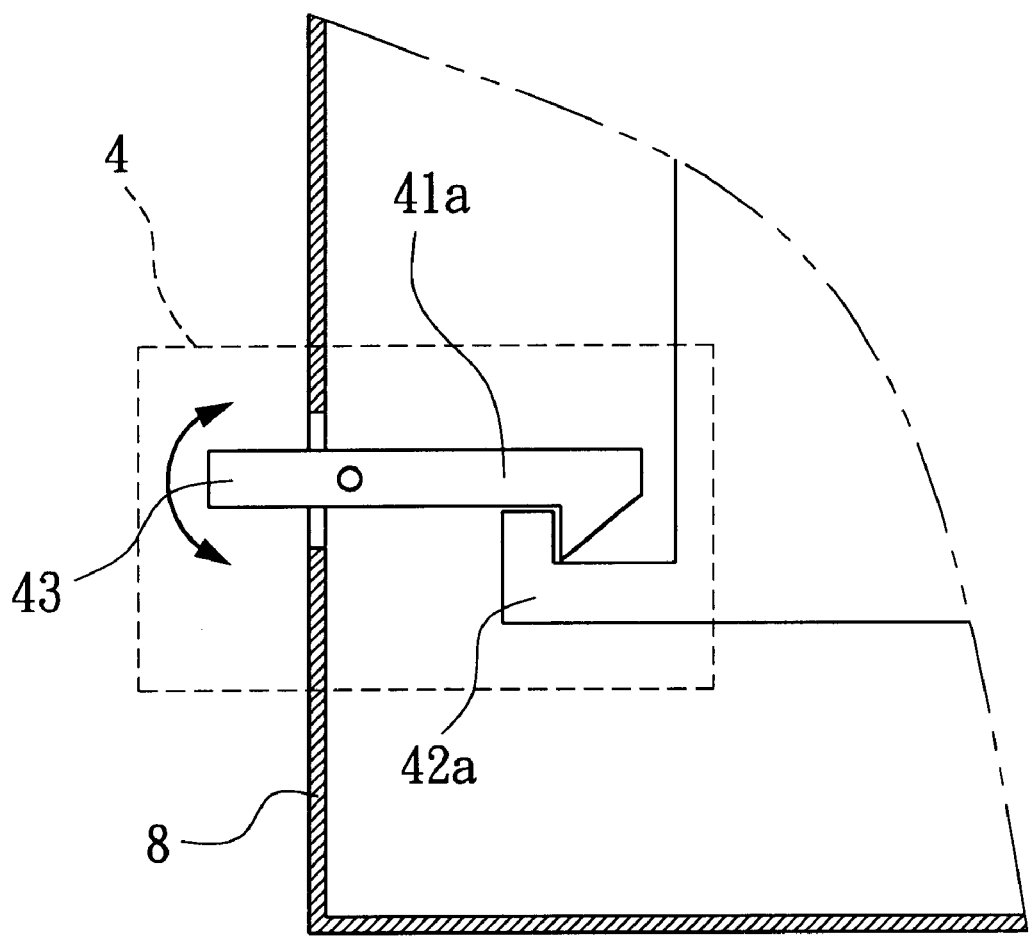
FIG. 2 is the preferred embodiment of the fastening structure of the invention.
Figure 3:
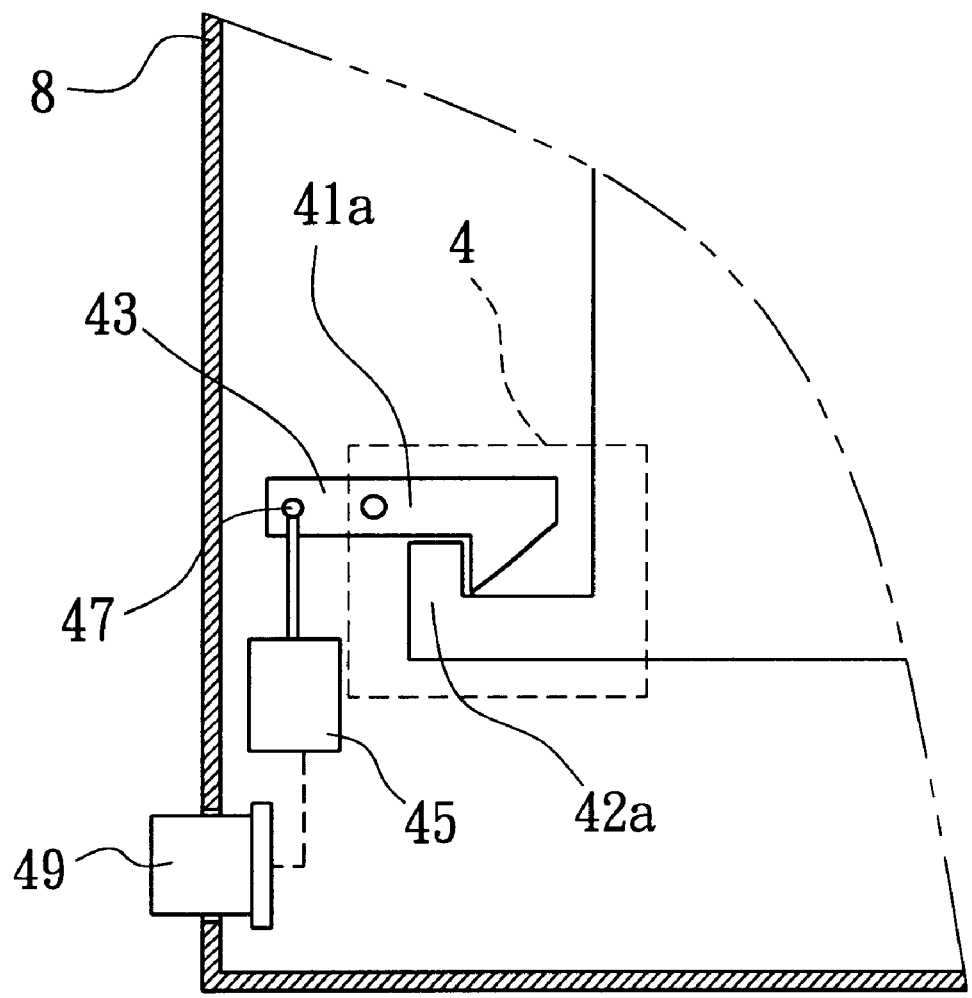
FIG. 3 is another preferred embodiment of the fastening structure of the invention.

The aforesaid fastening structure 4 may be with two preferred embodiments for releasing via elastic potential energy. Please refer to FIG. 2, which is the preferred embodiment of the fastening structure of the invention. Wherein, a stir 43 is the extension of an elastic fastener 41a and protrudes outside of a scan body 8, thus the pivot design is convenient to release the elastic fastener 41a and a fixed fastener 42a of the fastening structure 4. Please refer to FIG. 3, which is another preferred embodiment of the fastening structure of the invention. The embodiment is that a link 47 is added on one end of a stir 43, the connecting end of the stir 43 and the link 47 adopts pivot design. When a button 49 is pressed down to start an electromagnetic valve 45, a drive link 47 moves up and down to make an elastic fastener 41a swing as a pendulum, and a fixed fastener 42a is then released.

Figure 4:
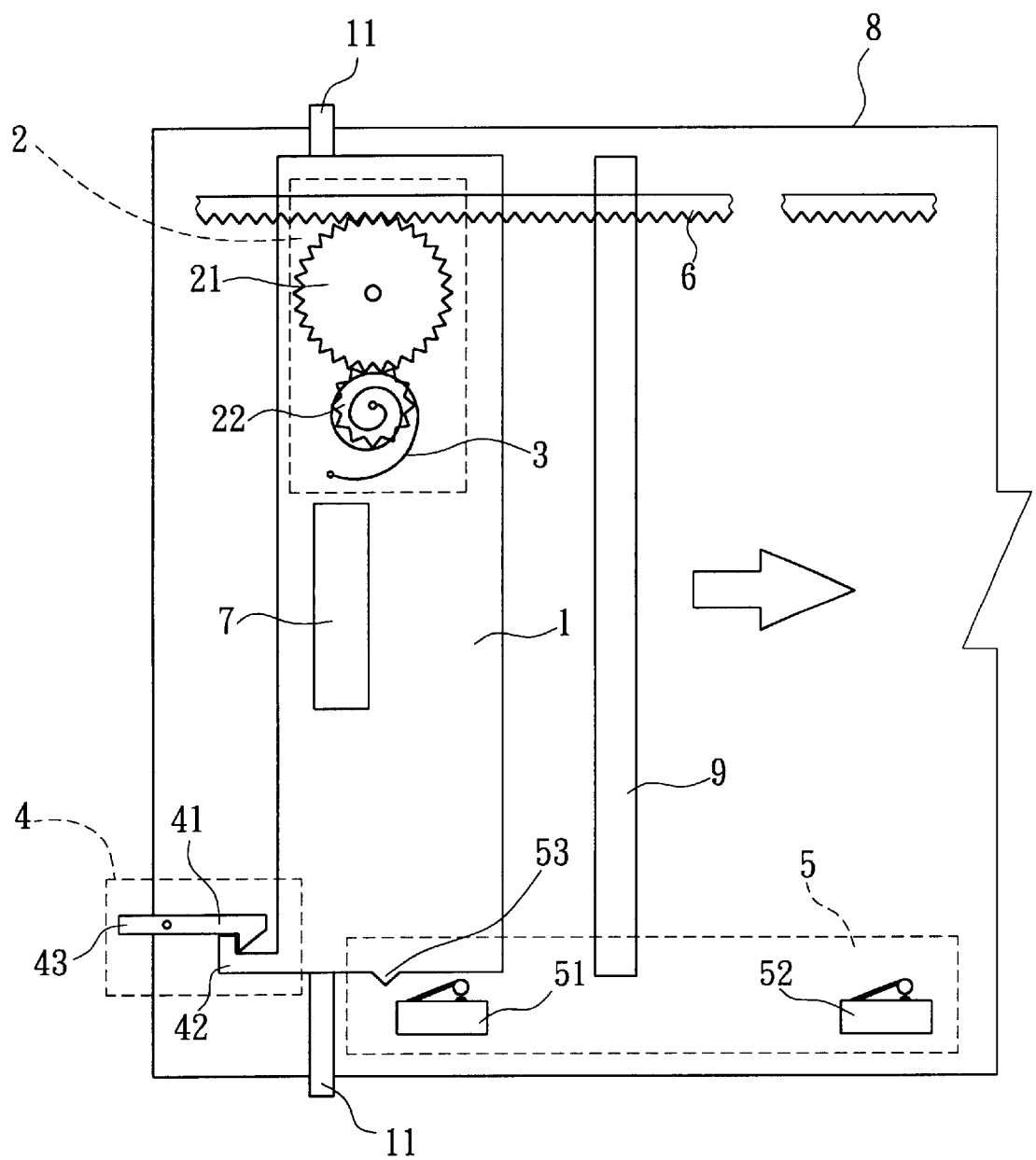
FIG. 4 is another preferred embodiment of the invention.

Please refer to FIG. 4, which another preferred embodiment of the invention. There is an applied rod 11 installed on two sides of a chasses 1 for user applying force. User may apply force on two sides of the applied rod 11 to move the chasses 1 toward left on FIG. 4, then continuing move the chasses 1 to an original starting place (not shown in figure). When chasses 1 moving toward right for scanning, a standard color plate 9 be firstly scanned before an image sensor 7 scanning a scanned object (not shown in figure) to compare those scanned colors with the standard colors for adjustment.

The device and theory of the invention are simple, but it is to substitute for the prior art of motor. The invention is not only making both design and motor costs down for lighter product, but also saving power sources. Under the present situation that most issues are related to the environment protection, this invention is sort of mileage stone. In future, the invention can be a paragon for applying elastic force and its storing ability feature. Therefore, as a conclusion, the invention truly matches the patent definition.

Of course, the present invention has been described above by taking the case as better embodiment, but implementation scope of the present invention is not really limited to the scope of the embodiment described. All of the modifications, which are made by those whom familiar with the art without departing from the spirit of the invention, belong to the scope of the present invention. Thus the protective scope of the invention is based on the following claims.

What the claim is:

1. A scan device with elastic reserve comprising:

at least a guide means installed on a scan body of the said scan device;

a chassis perpendicular to the guide means for mounting a gear structure, which includes at least one gear, and the gear structure mounted on the chassis to work with the guide means for transmission;

an elastic module positioned on the chassis to work with the gear structure and guide means, wherein the chassis moves to reserving a suitable amount of elastic potential energy of the elastic module when turning the gear structure;

a fastening structure which includes a flexible fastener and a fixed fastener, the flexible fastener provided on the scan body and the fixed fastener provided on the chassis, wherein the flexible fastener is designed to move when the fixed fastener meets or touches the flexible fastener, and the flexible fastener returns to an original position to buckle with the fixed fastener;

a sensor device which includes a first sensor, a second sensor and an object, wherein the object is provided on the chassis so that when the elastic module reserves a suitable amount of elastic potential energy, the buckling of the fixed fastener and elastic fastener is released, and the chassis moves toward a reverse direction of reserving energy, so that the object meets the first sensor on the scan body after the chassis moves a predetermined distance, then the object meets the second sensor on the scan body after the chassis moves a distance further than the predetermined distance.

2. The scan device of claim 1, wherein a COD (Charge Couple Device) is installed on the chassis.

3. The scan device of claim 1, wherein a CIS (Contact Image Scan) is installed on the chassis.

4. The scan device of claim 1, wherein the elastic module is a spring structure.

5. The scan device of claim 1, wherein the object meets the first sensor to start scanning.

6. The scan device of claim 1, wherein after the object meets the first sensor, a standard color plate is firstly scanned for comparison and adjustment of the scan device.

7. The scan device of claim 1, wherein the object meets the second sensor to shut down scanning.

* * * * *